(12) United States Patent
Clunn et al.

(10) Patent No.: US 6,426,634 B1
(45) Date of Patent: Jul. 30, 2002

(54) CIRCUIT BREAKER WITH INTEGRATED SELF-TEST ENHANCEMENTS

(75) Inventors: Robert Henry Clunn, Richardson; LeRoy Blanton, Garland, both of TX (US)

(73) Assignee: George A. Spencer, Garland, TX (US)

( * ) Notice: Subject to any disclaimer, the term of this patent is extended or adjusted under 35 U.S.C. 154(b) by 0 days.

(21) Appl. No.: 09/538,395

(22) Filed: Mar. 29, 2000

Related U.S. Application Data

(60) Provisional application No. 60/126,779, filed on Mar. 29, 1999.

(51) Int. Cl.[7] .......................... G01R 31/08; G01R 13/02
(52) U.S. Cl. ................. 324/536; 324/76.47; 324/76.55; 324/522
(58) Field of Search ...................... 324/424, 76.47, 324/76.55, 536, 522; 361/93.2, 98, 94, 85

(56) References Cited

U.S. PATENT DOCUMENTS

| | | | | | |
|---|---|---|---|---|---|
| 4,689,570 | A | * | 8/1987 | Ohgaki et al. | 324/418 |
| 4,758,779 | A | * | 7/1988 | Thong | 324/72.5 |
| 5,166,887 | A | * | 11/1992 | Farrington et al. | 700/293 |
| 5,189,589 | A | * | 2/1993 | Maschall | 361/93.2 |
| 5,278,771 | A | * | 1/1994 | Nyenya | 700/293 |
| 5,418,464 | A | * | 5/1995 | Swift | 324/537 |
| 5,428,495 | A | * | 6/1995 | Murphy et al. | 361/85 |
| 5,512,832 | A | * | 4/1996 | Russell et al. | 324/522 |
| 5,561,605 | A | * | 10/1996 | Zuercher et al. | 702/64 |
| 5,578,931 | A | * | 11/1996 | Russell et al. | 324/536 |
| 5,682,287 | A | * | 10/1997 | Pollman et al. | 361/93.2 |
| 6,078,489 | A | * | 6/2000 | Messerli et al. | 361/87 |
| 6,097,192 | A | * | 8/2000 | Obermeier et al. | 324/424 |

* cited by examiner

*Primary Examiner*—N. Le
*Assistant Examiner*—Wasseem H. Hamdan
(74) *Attorney, Agent, or Firm*—Howison, Thoma & Arnott, L.L.P.

(57) ABSTRACT

A circuit switching device or circuit breaker with integrated self-test enhancements is disclosed having separable contacts operable under processor control to control power to a circuit responsive to at least one of a plurality of fault conditions and operable according to a method for testing, including the steps of: controlling the switching device during a sampling cycle, to input one or more operating parameters sensed in the circuit to an A/D converter for measurement wherein the operating parameters enable detection of the fault conditions; determining whether to read a select one of the operating parameters from an output of the A/D converter into a first memory; and reading pre-determined parameter values from a second memory into the first memory during the sampling cycle instead of the operating parameters read from the A/D converter if a self-test has been invoked during the sampling cycle.

39 Claims, 5 Drawing Sheets

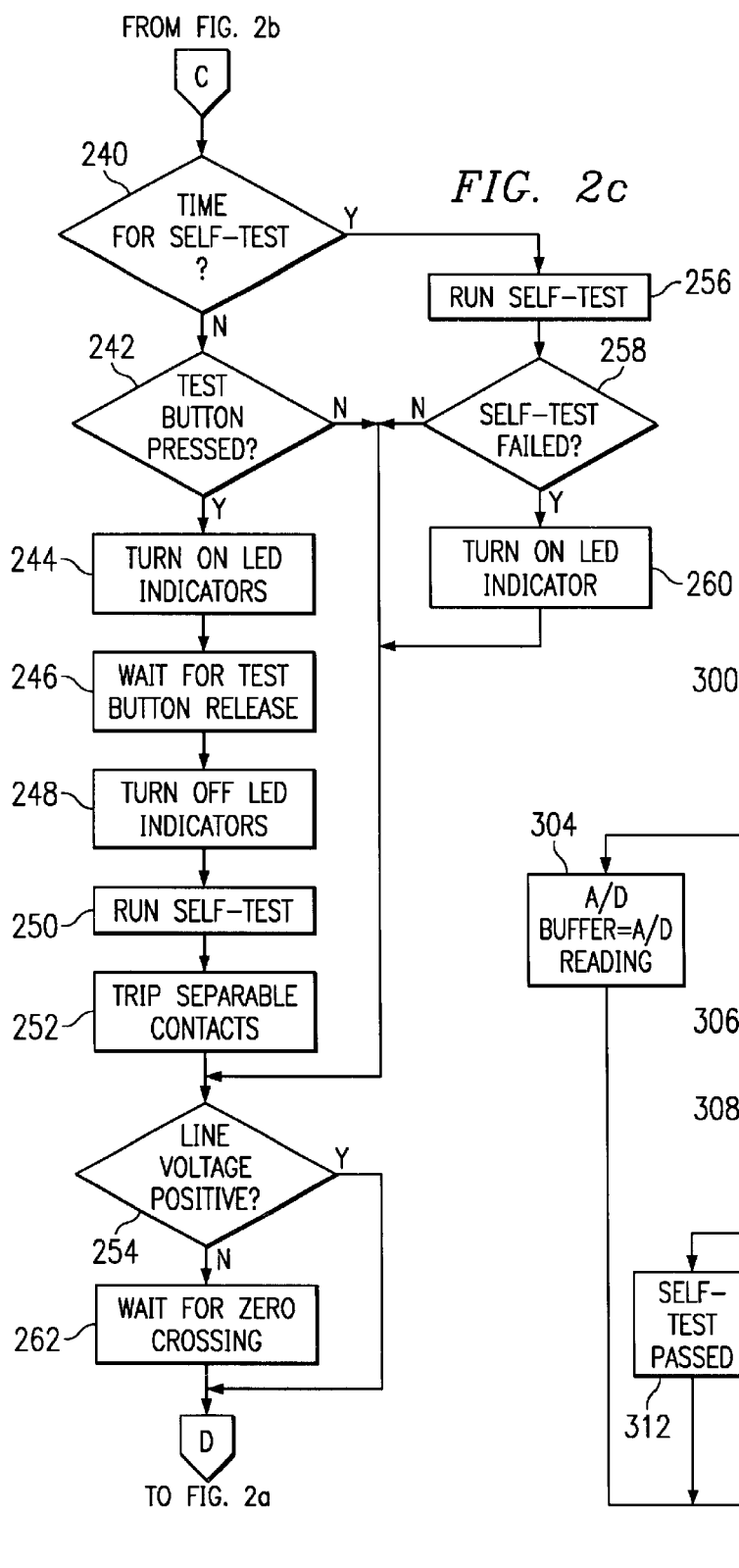

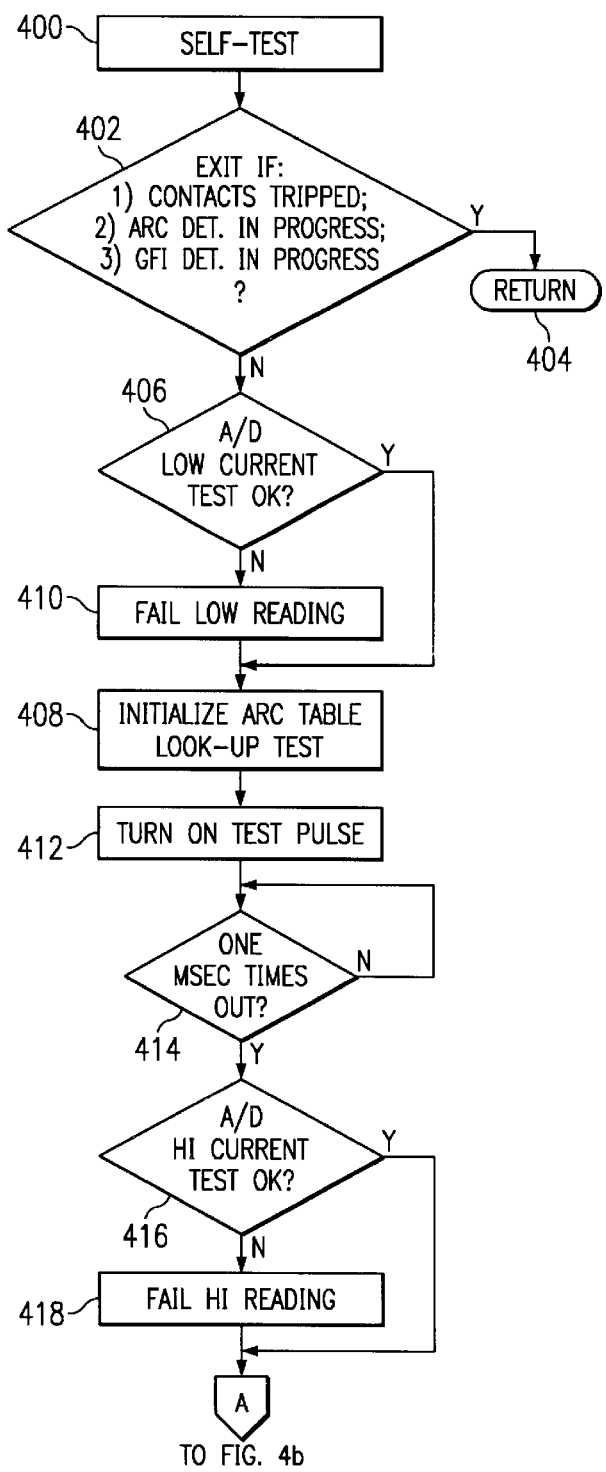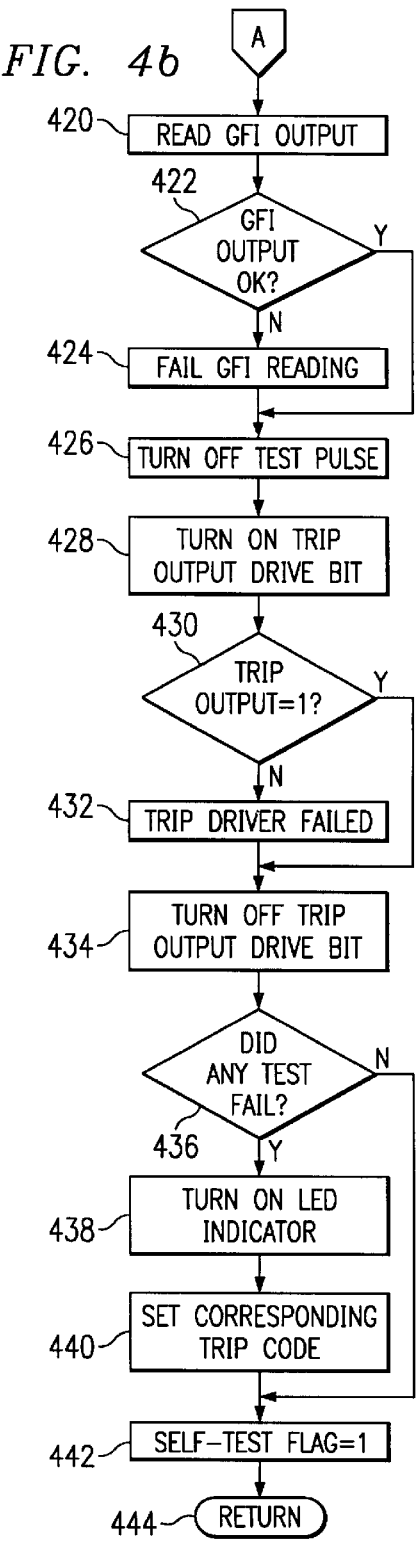

CIRCUIT BREAKER WITH INTEGRATED SELF-TEST ENHANCEMENTS

CROSS-REFERENCE TO RELATED APPLICATIONS

This application claims priority under 35 U.S.C. 119(e) from U.S. Provisional Patent Application Serial No. 60/126,779 filed on Mar. 29, 1999 having the same title as this application.

TECHNICAL FIELD OF THE INVENTION

The present disclosure pertains in general to electronic circuit breakers and, more particularly, to an electronic circuit breaker operating under programmed control and having a variety of self-test operations integrated into the operating sequence of the switching device or circuit breaker.

BACKGROUND OF THE INVENTION

Recently, designers of switching devices and circuit breakers have introduced fault interrupting circuits into the operational features of these devices. The added features introduce another level of protection for the user by tripping the device responsive to another set of common faults which were not detectable in the earlier circuit switching designs. For example, a ground fault circuit interrupter (GFCI) responds to a net imbalance in the current flowing through the line and neutral conductors to a connected load device. If the current differs by more than a few milliamps, a leakage current path may exist between one of these conductors and accessible surfaces or earth ground, resulting in a possible shock hazard. As another example, an arc fault circuit interrupter protects against arcing faults, which may ignite combustible materials in the vicinity of the arc fault. These types of fault interrupter devices are typically tested by the manufacturer, and they also offer and include a push-to-test button on the device for the user to operate a test. It would be much more useful to be able to test these circuit interrupting devices periodically and to test them in situ while in use to maximize the assurance that they are functioning effectively, it would also be advantageous to provide this additional test capability at little or no increase in cost.

SUMMARY OF THE INVENTION

A method is disclosed for testing a circuit switching device or circuit breaker having separable contacts operable under processor control to control power to a circuit responsive to at least one of a plurality of fault conditions, comprising the steps of controlling the switching device during a sampling cycle, to input one or more operating parameters sensed in the circuit to an analog-to-digital (A/D) converter for measurement wherein the operating parameters enable detection of the fault conditions; determining whether to read a select one of the operating parameters from an output of the A/D converter into a first memory; and reading pre-determined parameter values from a second memory into the first memory during the sampling cycle instead of the operating parameters read from the A/D converter if a self-test has been invoked during the sampling cycle.

In another aspect of the present disclosure, an apparatus for testing a circuit switching device such as a circuit breaker having separable contacts for controlling power supply to a circuit responsive to at least one of a plurality of fault conditions, comprising a processor having an A/D converter with parameter inputs coupled thereto and operating according to a periodic sampling cycle to measure operating parameters of the circuit and detect the fault conditions occurring therein; a first memory coupled to the processor for storing the operating parameters of the circuit output from the A/D converter during measurement by the processor for use in determining the fault conditions; and a second memory coupled to the processor and having stored therein predetermined parameter values for substitution for the measured parameters when a self-test is being invoked during a sampling cycle.

BRIEF DESCRIPTION OF THE DRAWINGS

For a more complete understanding of the present invention and the advantages thereof, reference is now made to the following description taken in conjunction with the accompanying Drawings in which:

FIG. 2b illustrates a continuation of the flowchart of FIG. 2a;

FIG. 2c illustrates a continuation of the flowchart of FIG. 2b;

FIG. 3 illustrates a flowchart for a portion of the principal sequence of operations illustrated in the flowchart of FIG. 2; and FIGS. 4a and 4b illustrate a flowchart for the self-test portion of the principal sequence of operation illustrated in FIG. 2.

DETAILED DESCRIPTION OF THE INVENTION

Figure 1A:
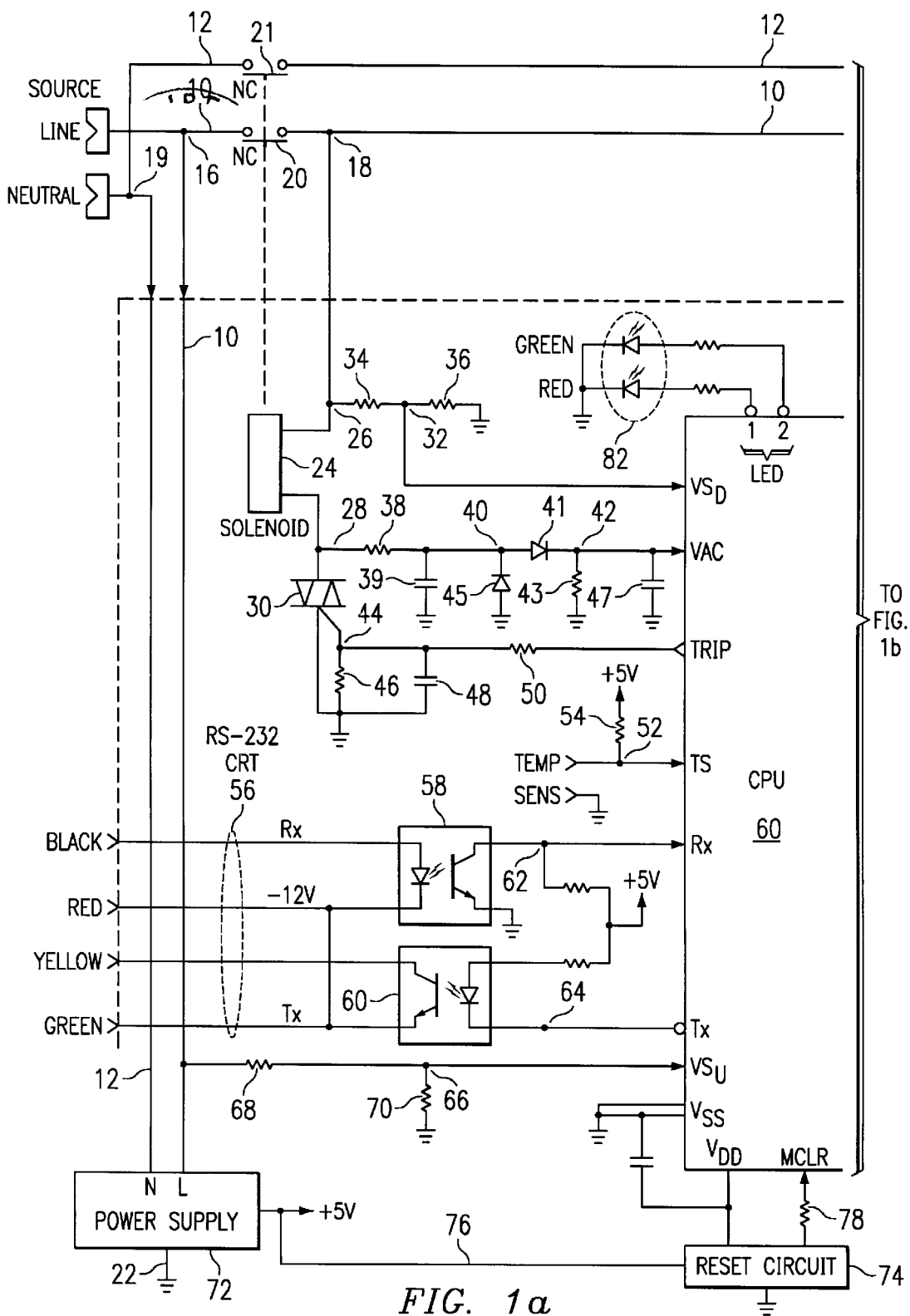
FIG. 1 illustrates a schematic diagram of an embodiment of an electronic switching device or circuit breaker system according to the present disclosure.
Figure 1B:
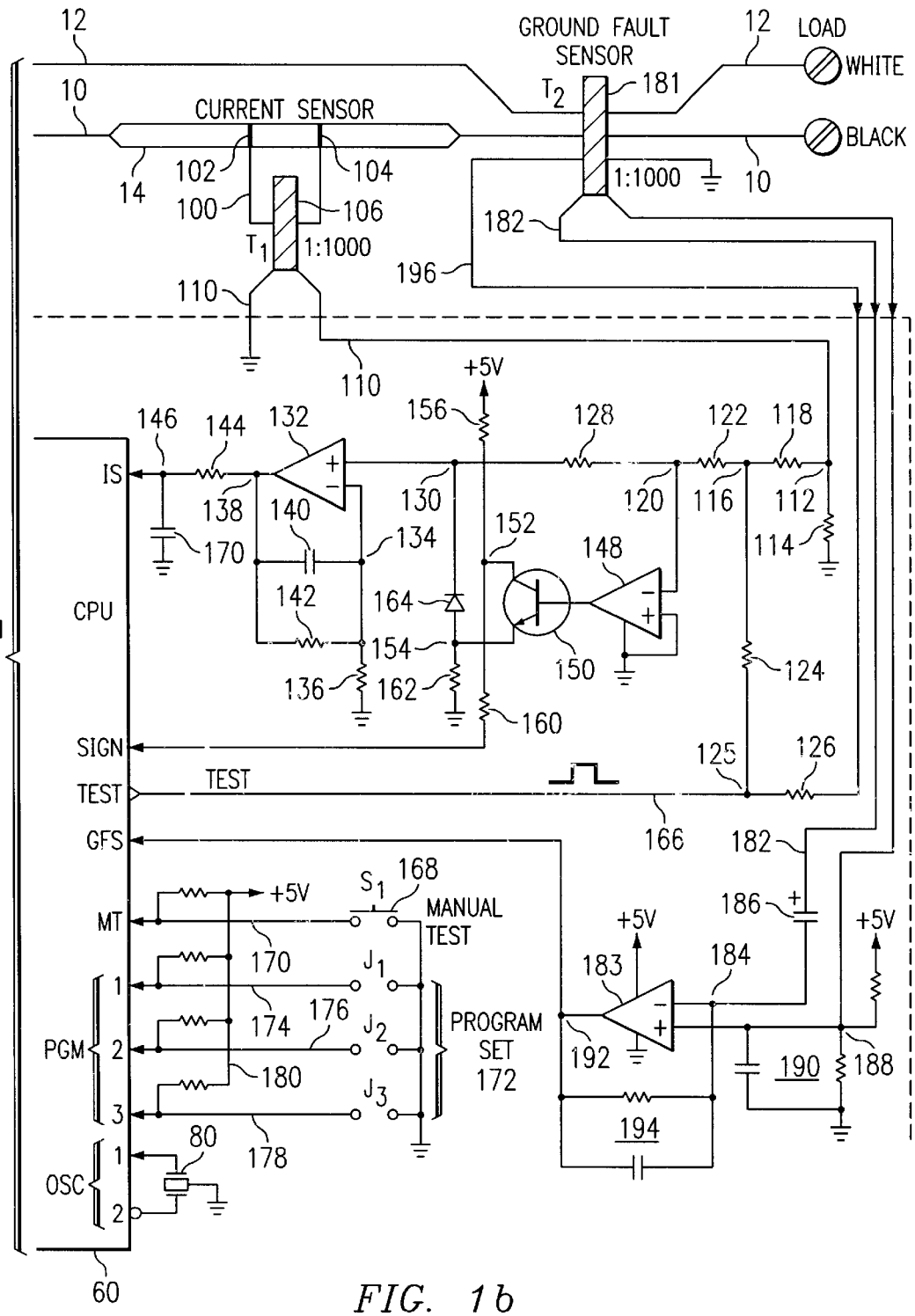

Referring now to FIG. 1, there is illustrated an electrical schematic diagram of the principal features of an embodiment of a switching device or circuit breaker of the present disclosure. A line conductor 10 and a neutral conductor 12 couple a source of AC power to a load. A section 14 of the line conductor 10 accessible to the switching device is shown as a double line having a defined gauge. The defined gauge may be typically 18 gauge or larger depending upon the current requirement of the branch circuit in which the device is utilized. The double-lined illustration of the section 14 enables the illustration of the structure of a current sensor to be described hereinbelow. Also shown along line conductor 10 are a node and a node 18 which are spaced on either side of a set of separable contacts 20. Separable contacts refer to the power switching contacts of a switching device or a circuit breaker connected in series with the line and neutral conductors of the AC line between the source and the load. Associated with the separable contacts 20 in the line conductor 10 is another set of separable contacts 21 in the neutral conductor 12. The separable contacts 20 and 21 may be mechanically coupled together so that they may be operated together. The neutral conductor 12 includes a node 19 upstream, that is, toward the AC source, from the separable contacts 21 and the unregulated input of a power supply 72. The power supply 72 includes a circuit ground at a node 22. The separable contacts 20 and 21 may be operated by a power relay or solenoid 24 having an operate coil connected at one end to a node 26 and at the opposite end to a node 28. Node 26 is coupled to a node 18. The main terminals of a Triac 30 are coupled respectively between node 28 and the circuit ground at node 22.

Continuing with FIG. 1, there is a node 32 at the junction of a resistive divider comprising a resistor 34 and a resistor 36. The resistor 34 is coupled between the node 26 and the node 32 and the resistor 36 is coupled between the node 32 and the node 22 at circuit ground. A major component of the switching device of the present disclosure is a CPU 60 which may be a programmable microprocessor or its equivalent such as a PIC 16C73 available from MICROCHIP. CPU 60 has a number of input and output terminals which are coupled with various portions of the sensing and operating circuitry of the switching device. A node 16 on the line conductor 10 is located upstream from the separable contacts 20 and is coupled to the unregulated input of a power supply 72. The node 16 is also coupled to a resistor divider comprising resistor 68 and resistor 70 connected to the circuit ground at node 22. The junction between the resistor 68 and the resistor 70 at node 66 is coupled to a terminal of CPU labeled $VS_u$ signifying it as a terminal for sensing the voltage sense upstream. Similarly, the node 32 previously described connects to a terminal of CPU 60 labeled $VS_d$ signifying it as a terminal for sensing the voltage downstream from the separable contacts 20. A node 28 is coupled through to a resistor 38 to a node 40 and from 40 through a rectifier 41 to a node 42 which is coupled to the circuit ground at the node 22 through a resistor 43. A node 40 is connected to the circuit ground at the node 22 through a capacitor 39 and also through a rectifier 45. The anode of the rectifier 41 and the cathode of the rectifier 45 are each coupled to the node 40. A node 42 is also coupled to the circuit ground through a capacitor 47 and to a VAC terminal of CPU 60 to sense a voltage proportional to the supplied AC voltage source. This voltage is also used to test whether the coil at the solenoid 24 has continuity (voltage present at VAC) or lacks continuity (voltage absent at VAC).

Continuing with FIG. 1, there is shown the triac 30 having its gate terminal connected to a node 44 which is coupled to circuit ground at node 22 through the parallel combination of the resistor 46 and a capacitor 48. Node 44 is also coupled to a resistor 50 to a TRIP output terminal of CPU 60. A temperature sense terminal TS of CPU 60 which is coupled to a node 52 and also from node 52 through a resistor 54 to a +5 volt supply. A temperature sensing circuit, which may typically be a thermistor located in a specified position within the switching device (not shown) provides a temperature sense signal to terminal TS. CPU 60 further includes an RS-232 communications port 56 that includes both a receive circuit and a transmit circuit. The receive circuit is shown coupled through an opto-coupler 58 and the transmit circuit is shown coupled through an opto-coupler 60. The receive input RX is coupled to a node 62 which connects to the collector of the output transistor of the opto-coupler 58 and also through a pull-up resistor to the +5 volt supply. The emitter of the opto-coupler output transistor is connected to circuit ground. The LED of the opto-coupler 58 is coupled between the incoming receive line labeled as a black conductor and a common conductor labeled as a red conductor (also identified as a negative 12 volt supply line). In similar fashion, the transmit output TX of CPU 60 is coupled to a node 64 which also couples to the cathode of the LED within opto-coupler 60. The anode of the LED in opto-coupler 60 is coupled through a resistor to the +5 volt supply. The output transistor side of opto-coupler 60 is connected across the outgoing transmit line represented by the yellow conductor (connected to the collector) and the green conductor (connected to the emitter) which represents the return line, also coupled to the −12 volt supply.

Continuing with FIG. 1, power supply 72 converts the incoming AC line voltage applied to the terminals L and N of power supply 72 to the +5 volt regulated DC output voltage which is utilized by the circuitry of the switching device. A reset circuit 74 is shown coupled between the +5 volt output of power supply 72 along a line 76 and circuit ground at node 22. The reset circuit 74 couples the +5 volts DC to the CPU 60 at terminal $V_{dd}$ and provides for resetting the CPU through a resistor 78 to a terminal MCLR in the event of a detected voltage that is below the operating limit for the CPU 60. A terminal $V_{ss}$ of CPU 60 which is the substrate and internal ground system of the CPU 60, is shown coupled to circuit ground at node 22. A decoupling capacitor is shown connected between the $V_{dd}$ and $V_{ss}$ terminals of the CPU 60. A crystal 80 is connected between the oscillator terminals one and two of CPU 60 for providing a stable frequency reference for the internal oscillator of the CPU 60. A pair of light-emitting diodes 82 is shown coupled to respective terminals of the CPU 60. LED terminal 1 is coupled through a resistor and a red LED to circuit ground at node 22. LED terminal 2 is coupled through a resistor and a green LED to circuit ground at node 22. The red and green LEDs provide a display indicating various functions to be described hereinbelow. The configuration of LED or other types of annunciators such as beepers or other forms of display are possible and may of course vary with the particular application.

Continuing now with FIG. 1, the current sensing circuitry will now be described. There is shown coupled to the current sensing section 14 of line conductor 10 a single turn primary winding 100 connected between a node 102 and a node 104 which are separated by a predetermined distance along the section 14 of line conductor 10. This predetermined distance, which is a function of the wire gauge of the section 14, provides a calculated resistance value across which to sense a voltage drop proportional to the line current flowing in the resistance. The single turn primary winding 100 passes through a toroid core 106 to provide the primary winding of a current sensing transformer T1. The secondary winding 110 which is wound around the toroid core 106 is coupled at one end to circuit ground at node 22 and at the other end to a node 112. The turns ratio of the current sensing transformer T1 of the illustrative embodiment is one to one thousand relating the single turn primary 100 to a thousand turn secondary 110. This turns ratio may vary depending upon the particular application. Among the possible variables of interest are the current levels flowing in the line conductor section 14 and the sensitivity of the current sensing circuitry to be described hereinbelow. Briefly, the magnitude and waveform of the current flowing in current sensing section 14 of the line conductor is coupled through current sensing transformer T1 to the current sensing circuitry associated with amplifier 132. The analog value input to amplifier 132 is converted in an A/D converter within CPU 60.

Continuing with the current sensing circuitry, the node 112 connects to a resistor 114 to circuit ground and also connects to a node 116 through a resistor 118. The node 116 couples to a node 120 through a resistor 122 and through a resistor 124 to a node 125. The node 125 is further coupled to a resistor 126 along a line 196 passing through the toroid core 181 of a ground fault sensor transformer T2 to be described hereinbelow. The node 120 couples to the inverting input of an amplifier 148 and node 120 also couples to a resistor 128 to a node 130. The node 130 couples to the non-inverting input of an amplifier 132. The inverting input of amplifier 132 is connected to a node 134 which, in turn, is connected to ground through a resistor 136. The output of amplifier 132 is connected to a node 138. The node 134 is connected to node 138 through the parallel combination of capacitor 140 and resistor 142. The node 138 is coupled to a resistor 144 to a node 146, which node 146 is coupled to circuit ground through a capacitor 170. The node 146 is coupled to a current sense terminal IS of CPU 60. Returning now to amplifier 148, which has a non-inverting input coupled to circuit ground and an output coupled to the base terminal of a transistor 150. The collector terminal of transistor 150 couples to a node 152 which is coupled to +5 volt supply through a resistor 156. The node 152 is also connected through resistor 160 to a SIGN input terminal of CPU 60.

Continuing with FIG. 1 there is also shown a test line 166 which couples an output terminal labeled TEST of CPU 60 to a node 125. A TEST pulse, which is a positive going pulse of a predetermined duration, output from the TEST terminal of CPU 60, may be coupled through node 125 and resistor 124 to node 116 to simulate a current sense signal. The TEST pulse along line 166 coupled to node 125 may also be coupled through a resistor 126 and through a line 196, which passes through the center of a toroid core of transformer T2, to simulate a ground fault sense signal. In either case, the TEST pulse is provided to simulate a sensed signal which, when processed in the respective sensing circuits causes a predetermined output useful for testing the operation of the entire current sensing or ground fault sensing and processing circuitry.

Continuing with FIG. 1, there is shown a manual test and a program set network coupled to related terminals of CPU 60. A manual test switch 168 identified as S1 is coupled on one side through a line 170 to an MT terminal of CPU 60 and on the other side to circuit ground at the node 22. Program set jumpers, collectively 172, comprising jumpers J1, J2 and J3 are coupled between PROGRAM (PGM) terminals 1, 2 and 3 of CPU 60 and circuit ground at node 22. Jumper J1 is coupled through line 174 to PGM 1, jumper J2 is coupled along line 176 to PGM 2 and jumper J3 is coupled along line 178 to PGM 3. Each terminal MT and PGM 1, 2 and 3 of CPU 60 are coupled to the +5 volt supply through respective pull-up resistors collectively shown as circuit 180.

Continuing now with FIG. 1, the ground fault sensing circuitry will be described. Passing through a ground fault sensor transformer T2 represented by toroid core 181 are line conductor 10 and neutral conductor 12 which supply AC power to a load. The line conductor 10 and the neutral conductor 12 represent primary windings of T2 which normally conduct equal and opposite currents passing through the toroid core 181. Also passing through the toroid core 181 is a single ground fault test winding 196 connected to circuit ground which also functions as a primary winding of the ground fault sensing transformer T2 when a predetermined test current is present therein. The secondary winding 182 of the ground fault sensing transformer T2, which may include one thousand turns in the illustrative example, provides a step-up turns ratio of one to one thousand. This turns ratio may vary depending upon the particular application such as the current to be sensed, the sensitivity of the sensing circuit, etc. The secondary winding 182 is coupled at one end to node 184 through a capacitor 186 and at the opposite end to a node 188. The node 184 is coupled to the inverting input of an amplifier 183. The node 188 is coupled to a resistor to the +5 volt supply and also to the non-inverting input of amplifier 183. Node 188 is coupled to circuit ground through a parallel RC network 190. The output of amplifier 183 is coupled to a node 192 and also to a ground fault sense terminal (GFS) of CPU 60. Coupled between node 192 and the node 184 is a feedback network 194 comprising the parallel combination of a resistor and a capacitor.

In operation, the programmable CPU 60 provides for the operation of the switching device of the present disclosure under a variety of conditions which are described in the U.S. Pat. No. 5,875,087 entitled "CIRCUIT BREAKER WITH INTEGRATED CONTROL FEATURES" and assigned to the Assignee of the present application, which patent is incorporated by reference herein in its entirety. Briefly, the switching device of the present disclosure, which may also be described as an intelligent circuit breaker, responds to various conditions on the AC power line coupled between a source and a load and provides for interrupting the flow of current under certain fault conditions. The interrupting function is provided by the solenoid 24 which is responsive to a trip pulse emitted by CPU 60 under the appropriate conditions. The trip pulse is applied to the gate of the triac 30 which enters a conduction mode and causes current to flow through the solenoid 24 connected between nodes 26 and 28 and through the triac 30 to circuit ground. The CPU 60 also has the capability of communicating with external computers, intelligent terminals or other devices through the RS-232 port whose operation is described in the previously mentioned U.S. Pat. No. 5,875,087. The program set jumpers, collectively 172, provide for pre-programming various operating functions of the switching device as also described in the aforementioned U.S. Patent.

Turning now to the sensing operations of the switching device controlled by CPU 60, reference is made to the three voltage sense terminals shown as $VS_d$, $VS_u$ and VAC in the diagram of FIG. 1. $VS_d$ senses the divided down value of the downstream AC voltage at node 18 along line conductor 10. $VS_u$ senses the divided down value of the upstream AC voltage at 016 also along line conductor 10. When the voltages at $VS_d$ and $VS_u$ are substantially the same, then a clear indication is given that the separable contacts 20 and 21 are closed and that AC current is being supplied to the load from the source along line conductor 10. This condition signifies that the relay 24 is in a released condition and the mechanically coupled, separable contacts 20 and 21 are both in a closed position providing full continuity between source and load along the line connector 10 and the neutral conductor 12. An AC voltage will be indicated at $VS_u$ whenever AC power is available to the switching device and to a connected load. $VS_d$, however, will show a voltage reading only when the separable contacts are in the closed position. The use of these two sensed AC voltage levels will be described hereinbelow. The AC voltage terminal, VAC, of CPU 60 senses a DC voltage proportional to the AC source voltage and provides an indication of whether the solenoid 24 has continuity. The voltage present at terminal VAC is stepped down by the action of the resistor divider comprising resistor 38 and resistor 43. Rectifier 41 rectifies the AC voltage so that a positive polarity DC voltage appears across resistor 43. Capacitor 47 is provided for filtering higher frequency noise from the DC voltage. Rectifier 45 provides a negative clamp to prevent the negative swing of the incoming AC voltage from exceeding the input rating of the internal A/D converter of CPU 60 that is responsive to the voltage present at terminal VAC.

Continuing with the operation of FIG. 1, when it is desired to trigger the solenoid 24 into opening the separable contacts 20 and 21 in the presence of some fault condition detected by other circuitry of the switching device, a trip pulse is output from CPU 60 at the TRIP terminal through resistor 50 to node 44 and the gate terminal the triac 30. This trip pulse is a logic high level which has a duration sufficient to cause the triac 30 to fire and remain in conduction until the source of AC operating voltage is removed.

The operation of the current sensing circuitry illustrated in FIG. 1 will now be described. The current flowing in line conductor 10 is continuously monitored by the current sensor associated with the transformer T1. Currents flowing in the section 14 of line conductor 10 develop a voltage drop between the nodes 102 and 104, which voltage is also applied across the single turn primary winding 100 passing through the toroid core 106 of the current sensing transformer T1. The signal is stepped up by the transformer action and is supplied to node 112 and there along resistor 118 and resistor 122 to node 120 which is the inverting input of amplifier 148. From node 120, a positive signal voltage passes directly through resistor 128 to the non-inverting input of amplifier 132 and after amplification therein to node 138 and resistor 144 to node 146 to the current sense terminal of CPU 60. The current sense terminal IS is the input to an A/D converter which converts the analog signal at node 146 into digital form for processing within CPU 60. Returning to node 112, a negative signal is inverted by inverting amplifier 148 which drives a follower transistor 150 to develop two signals, one at node 152 and one at node 154. The signal at node 154, which is out of phase with the signal at node 112, causes rectifier 164 to conduct when the voltage at node 154 is more positive than the voltage at node 130. This condition occurs when the voltage at node 112 is swinging in a negative direction. Thus, due to the action of the signal polarity at node 112 and the single phase inversion that occurs through the combination of inverting amplifier 148 and follower transistor 150, the circuit of resistors 118 and 122, the inverting amplifier 148, the follower transistor 150, rectifier 164 and feedback resistor 128 acts as a full wave rectifier, supplying a positive DC rectified version of the current sense signal to the non-inverting input of amplifier 132.

The operation of the full wave rectifier circuit of amplifier 148 is as follows: whenever the input signal at node 112 is positive, the output of inverting amplifier 148 is driven negative to ground, turning off transistor 150 and rectifier 164, thereby disconnecting the output of amplifier 148 from its feedback path at node 130. This action allows positive input signals from node 112 to be passed directly through resistors 118, 122 and 128 to the non-inverting input of amplifier 132, and after amplification therein to node 138, then through resistor 144 to node 146 and the A/D converter input of CPU 60. Returning to the input signal at node 112, whenever its output drives the emitter of transistor 150 and the anode of rectifier 164 in a positive direction, the feedback path is completed via node 130 and the feedback resistor 128 to node 120, the summing junction. The value of resistor 128, which is set equal to the sum of resistors 118 and 122, will produce a value of voltage at node 130 equal to but inverted with respect to that of the negative input signal from node 112, thus providing the required positive signal to amplifier 132, as previously described. The purpose of this full wave rectification is to ensure that the voltage present at node 146 is a positive voltage and does not cause the input to the A/D converter at input IS of CPU 60 to go in a negative direction. Returning to node 152, at the same instant that the signal voltage at node 112 is negative, the voltage at node 152 is likewise negative (from +5v) because of the two successive phase inversions that occur in amplifier 148 and transistor 150. The signal at 152, which has the same sign as the voltage at node 112, then causes a signal to pass through resistor 160 to the SIGN input of CPU 60 to convey the polarity of the input current sense signal for use by the CPU 60 in measuring the line current parameters.

Continuing with FIG. 1, the operation of the ground fault sensing circuitry will now be described. When the net current flowing through the conductors passing through the toroid core 181 of ground fault sensing transformer T2 is non-zero, that is, an imbalance in the current exists, a current leakage path to earth ground is probably present between either line conductor 10 and earth ground or between the neutral conductor 12 and earth ground. Such an imbalance or leakage path is typically caused by a fault in the load device and represents a safety hazard since a harmful AC voltage may be applied to the cabinet or other accessible surfaces of the load device. Such a leakage current develops a voltage across the secondary winding 182 of the ground fault sensing transformer T2 which is stepped up by a turns ratio which in this illustrative example is one to one thousand. This turns ratio may vary depending upon the particular application and depends on the current levels flowing in the line and neutral conductors as well as the sensitivity of the detection circuitry used to detect such a ground fault condition. A signal current corresponding to the leakage current is supplied through capacitor 186 to the inverting input of amplifier 183 for amplification and coupling through node 192 to the ground fault sensing input terminal of CPU 60. The input signal is coupled to the analog-to-digital converter within the CPU 60 for measurement therein.

Both the current sensing input circuitry and the ground fault sensing input circuitry described hereinabove may be tested by a single test pulse waveform that is output from the TEST terminal of CPU 60. The test waveform appears along line 166 in the form of a positive going logic pulse. In other words, it is an active high logic pulse for a predetermined duration and then allowed to decay back to the low logic level. By the resistor divider action of resistors 124, 118 and 114 in the case of the current sensing circuitry and resistor 126 and the output of T2 across the inputs of amplifier 183, a replica of this pulse of an appropriate amplitude to develop a simulated sensing current or simulated ground fault leakage current is developed at the respective inputs to the detection circuitry. For example, the test pulse appears at node 116 at a level to simulate the appearance of a predetermined amount of current flowing in the line conductor 10. Similarly, the current appearing at node 184 is simulated by an appropriately sized replica of the test pulse at node 125 which simulates a typical ground fault leakage current that may be detected by the ground fault sensor T2. Thus, when the operating program to be described hereinbelow of CPU 60 indicates that a test is to be conducted of either the current sensing circuitry or the ground fault sensing circuitry, a test pulse is emitted by CPU 60 and the response at the respective sensing terminal of the CPU which is connected internally to the analog-to-digital converter inputs is determined and evaluated to gauge the result of the test. Similarly, the operating program of CPU 60 evaluates the voltage at the AC voltage terminal VAC and detects occurrence of the zero-crossing event of both the downstream voltage sense terminal $VS_d$ and the upstream voltage sense terminal $VS_u$. Further, a signal representing the temperature as measured by the temperature sensor at a specified location is available for evaluation at terminal TS of CPU 60. In the illustrative embodiment the terminals VAC and TS are inputs to an A/D converter within CPU 60 and the terminals $VS_d$ and $VS_u$ are inputs to circuitry which convert the zero crossings of the AC signal to a binary signal to represent the zero crossing event of the respective signal when they are present. All of these sensed parameters may be evaluated by the internal program operation of CPU 60. Some of these program routines may be modified as determined by the position of the jumpers J1, J2 and J3 in the program set jumpers, collectively 172, as shown in FIG. 1.

Figure 2A:
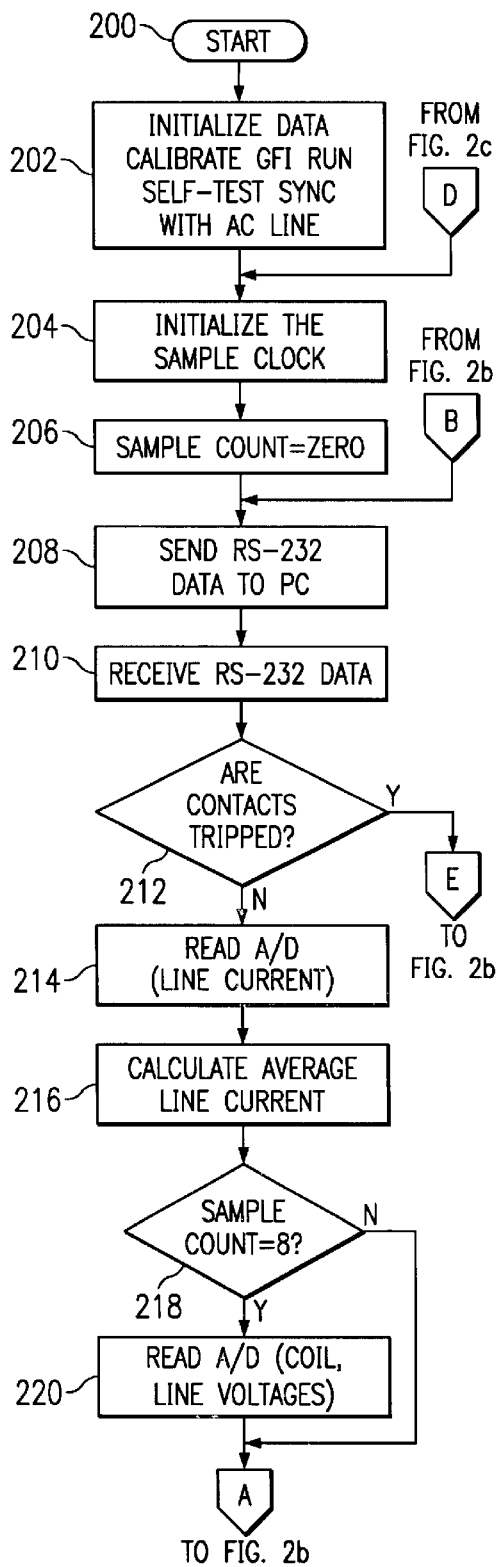
FIG. 2a illustrates a first portion of a flowchart of the principal sequence of operations in the embodiment of the switching device illustrated in FIG. 1.

Referring now to FIG. 2, there is illustrated a flowchart of the principal sequence of operations in the embodiment of the switching device illustrated in FIG. 1. Beginning with the Start block 200, the flow proceeds to block 202 wherein a number of preliminary operations are processed to initialize, calibrate, test and synchronize the system with the AC line source voltage. Following initialization of the data, calibration of the ground fault interrupting circuitry, running a self-test routine to be described hereinbelow and synchronizing the internal clock with the AC line frequency, the flow proceeds to block 204 to initialize the sample clock which controls the rate at which the various steps of the operating sequence are processed. The flow proceeds from block 204 to block 206 to look for a sample count of zero which marks the beginning of the operating sequence. The flow then proceeds from block 206 to block 208 where data to be sent to the external PC may be transmitted via the RS-232 communications port. After transmission of data to the external PC in block 208, the flow proceeds to block 210 where the system is enabled to receive data from the external communicating device, again over the RS-232 communications port. After the receive step, the flow proceeds to a decision block 212 to determine whether or not the separable contacts 20,21 have been tripped to an open position by operation of the solenoid 24. In this decision block, the CPU looks at a status bit that is set according to whether the separable contacts are open or not. If the contacts are open, that means that the switching device has been tripped and the flow proceeds along the path labeled "Y" to a subsequent step to be described later along the path identified with the encircled letter E near the bottom of FIG. 2a. If, however, the decision in block 212 is that the separable contacts are not open as indicated by the path labeled "N", then the flow proceeds to block 214 where the CPU will read the output of the A/D converter which is configured for reading the line current via the current sensing circuit previously described. Reading the line current value, or a sequence of consecutive values to represent a waveform when checking for a particular waveform of the current, may include selecting hard-coded (in ROM) waveform table data to test the operation of the arc detection algorithms. These waveform data from ROM may be substituted for actual measurements but processed exactly the same as for actual measurements. The ROM-coded waveform data may also include "must trip" or "must not trip" waveform samples, for performing specific tests to check the boundaries of the capabilities of the switching device or circuit breaker. For example, one table in ROM may contain sample data for a "must pass" or "must not trip" test corresponding to arcing occurring during operation of a 1 KW lamp dinner at a 50% setting. As another illustrative example, a table may include sample data for a "must trip" test corresponding to a carbon arc path of more than 10 amperes peak amplitude. Upon reading the line current value output by the A/D converter in block 214, the flow proceeds to block 216 where the system calculates the average value of the line current and proceeds to the next decision block 218 to determine whether the sample count is equal to eight.

By way of explanation, the sampling frequency in the illustrative embodiment described herein divides the AC power line period into 32 intervals in order to provide 16 sampling intervals in each half cycle of the AC line current for the power line that operates at 60 Hz. The number 32 is a convenient number for use in a binary data processing system and it provides sufficient samples to accurately determine the current and voltage levels in a typical AC power distribution system with which the switching device of the present disclosure is intended to be used. It is important for the sampling frequency to be at least equal to the Nyquist rate of twice the highest frequency expected to appear in the AC voltage or current waveforms. At the sampling rate selected in this illustrative embodiment, a little less than 2 KHz, the sampling frequency is adequate for frequency components of up to approximately one kilohertz that may occur in the power line voltage or current waveforms, thus providing the ability to accurately respond to most waveform anomalies that may occur in practice in a typical system. Thus, with each half cycle divided into sixteen sample intervals, the eighth sample will be very near the peak value of the voltage or current that is being measured assuming a completely resistive load. Of course, for inductive or capacitive loads wherein the voltage and/or current are not in phase, then the peak values of the respective waveforms will occur at somewhat different sampling intervals and the system can be programmed to operate accordingly. In this illustrative example, the load is assumed to be resistive for simplicity sake so that the convenient and most accurate sample in which to measure the peak value of the voltage would be in the eighth sampling interval.

Returning to FIG. 2a and this illustrative example, if the determination made in decision block 218 is affirmative, then the flow proceeds to block 220 to read from the output of the A/D converter any of the AC line voltages that are input to the CPU 60 and selected to be read in a particular application process. As described previously, this may be the upstream AC voltage $VS_u$, the downstream voltage $VS_d$ or the AC voltage at node 28 between the solenoid 24 and the triac 30. For example, if the values for $VS_u$ and $VS_d$ are the same, the separable contacts are closed. If the voltage sensed at terminal VAC is the same as the voltage sensed at terminal $VS_d$ and the solenoid 24 is not energized, then the coil of solenoid 24 has continuity; but if VAC and $VS_d$ are not alike (except when solenoid 24 is energized) then the solenoid 24 may be open circuited. The values for each of these AC voltage parameters may also be used in various measurements or fault sensing routines such as described in the U.S. Pat. No. 5,875,087. If, returning to block 218, the sample count is not eight, the flow proceeds along the "N" path to bypass the operational step of reading the peak value of the AC line voltages. In either case, the flow proceeds to the next step along a path identified by an encircled letter A to enter the routine illustrated on FIG. 2b, which is the second portion of the main operating sequence of the switching device of the present disclosure.

Figure 2B:
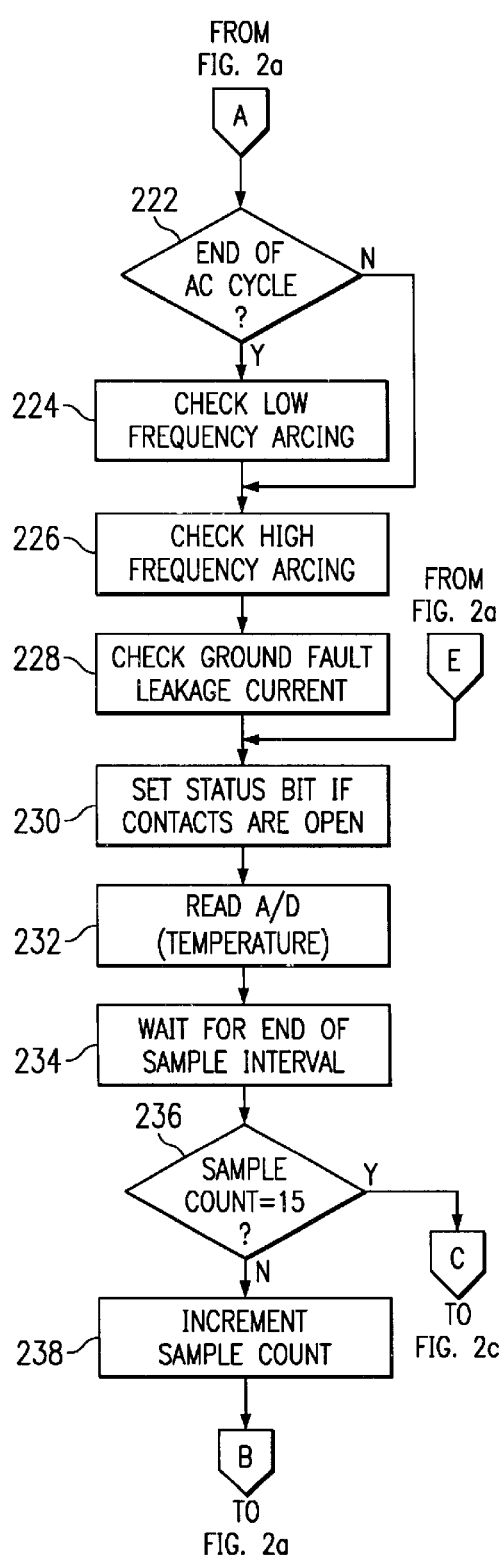

Continuing with FIG. 2b, the flow proceeds at the top of the page from the encircled letter A to the input to a decision block 222 to determine whether the sampling cycle has reached the end of an AC waveform cycle. If the answer is affirmative, then the routine for checking for low frequency arcing is initiated and completed in block 224 before returning the flow to the input to block 226. An example of a low-frequency arc detection process is described in the U.S. Pat. No. 5,875,087, incorporated herein by reference. A low frequency arcing condition is manifest by relatively large current amplitude disturbances in the waveform and may be a series arc such as a loose connection in a line or a parallel "line-to-line" fault. If, however, the end of the AC cycle has not been reached yet, then the flow proceeds directly from decision block 222 to the input of block 226 whereupon the system checks for high frequency arcing by a separate sub-routine. A high frequency arc is typically manifest by relatively small current amplitude variations that occur in serial arcing conditions. Such an arc fault may be simulated by a sine wave signal having significant electrical noise content. Upon completing the high frequency arcing check in block 226, the flow proceeds to block 228 to enter the sub-routine for checking the ground fault leakage current which includes evaluating the output of the A/D converter when set up to respond to the signals from the ground fault sensing circuitry external to CPU 60.

Upon completing the ground fault leakage current evaluation in block 228, the flow proceeds to block 230 to check whether the separable contacts are open or closed. It is in this step in block 230 where the system sets a status bit if the separable contacts of the switching device are indeed open, meaning that the separable contacts are in a tripped condition. The flow then proceeds to block 232 to read the output of the analog-to-digital converter when it is set to provide a temperature reading, which reading is stored in memory for later use as is the case with all parameter measurements. Following block 232, the flow proceeds to block 234 where the routine awaits the end of the sample interval, proceeds to a decision block 236 where a determination is made whether a sample count is, at this point, equal to fifteen. If the sample count is equal to fifteen indicating that the routine has progressed to near the end of a current half cycle of the AC voltage waveform, which is used as a reference for the sampling timing of the switching device, then the flow proceeds along the path labeled with a "Y" to the encircled letter C for continuation to FIG. 2c on the next page, which will be described hereinbelow. If, on the other hand, the sample count is not equal to fifteen, then the flow from decision block 236 flows along the N path to function block 238 where the sample count is incremented and the flow of the routine returns along the path marked by the encircled letter B to FIG. 2a to re-enter the routine at the input path to block 208 to send data to the external PC or other controller via the RS 232 communications port.

Referring now to FIG. 2c, beginning with the encircled letter C along a path to a decision block 240 where the system determines whether it is time for a self-test, this particular step is equivalent to determining whether a timer has expired or whether a counter has reached a specified count. In the illustrative embodiment disclosed herein, a sixteen bit counter increments at the end of each half-cycle of the AC voltage, that is every time the sample count equals fifteen in step 238 (see FIG. 2b ). Since this counter will overflow, for a 60 Hz line frequency, in a little over nine minutes, the self-test is performed approximately every nine minutes. This example is illustrative only and, though convenient in the particular embodiment disclosed herein, it is not intended to be limiting as many other timing or counting methods may be used, some programmable as in this example and some not programmable, to accomplish the operation of block 240 in FIG. 2c. If the result is affirmative, then the flow proceeds along the Y path to block 256 where the system runs the self-test routine to be described hereinbelow in conjunction with FIG. 4. If, however, the determination made in decision block 240 is negative, then the flow proceeds along the path labeled N to a decision block 242 to determine whether a test button has been pressed which is an action by a user to manually request that a self-test be run. If the result is negative, then the flow proceeds along the N path to return to the main routine at a subsequent point after bypassing completion of the self-test to be described. If, however, the test button was pressed by a user indicating manually that a self-test is to be run, then the flow proceeds along the Y path to block 244 to turn on one or more LED indicators to indicate that a manual test was requested. The flow then proceeds to block 246 where the system waits for the release of the test button prior to turning off the LED indicators in function block 248. Following the extinguishing of the LED indicators, the flow proceeds to block 250 where the system runs the self-test routine as illustrated on FIG. 4 hereinbelow. Upon the completion of the self-test routine or if a condition exists in which the separable contacts must be tripped, then the switching device or circuit breaker will be tripped in block 252 or equivalently, the switching device will act to open the separable contacts to interrupt the flow of AC power along the line conductor 10 and the neutral conductor 12. After the self-test is run in block 256, the system determines whether the self-test failed in block 258. If the self-test failed, the flow follows the "Y" path to turn on an LED indicator in block 260 and proceeds to decision block 254; but if the self-test did not fail, block 258 directs the flow along the "N" path to block 254.

Following the end of the self-test routine or in the event that a self-test was not requested, the flow proceeds along a path to the decision block 254 to determine whether the line voltage is in the positive half-cycle. This test is a way of determining whether the system is at the end of the sampling cycle which is indicated by a zero crossing of the AC voltage waveform. If the line voltage is in the negative half cycle, then the system waits in block 262 for a zero crossing to occur and returns to the main path which is identified by the encircled letter D. If the line voltage was greater than zero, then the flow proceeds along the path labeled "Y" to the encircled letter D to return to the main routine in FIG. 2a to the input of the block 204 to initialize the sample clock. It will be appreciated that, at the end of each sampling cycle which coincides approximately with the zero crossing at the end of each half cycle of the AC voltage waveform, the main program routine repeats itself through a sequence of some sixteen sampling intervals in this illustrative embodiment of the switching device of the present disclosure. Returning briefly to FIG. 2a of block 212, when a decision is made that the circuit breaker or the switching device is, in fact, tripped, then the flow proceeds along the Y path to an encircled letter E to be continued to FIG. 2b whereupon that path enters the main routine proceeding into block 230 wherein the status bit is set if the separable contacts are still open. If the separable contacts are closed during block 230, then the status bit is not set.

Referring now to FIG. 3, there is illustrated a flowchart for a portion of the principal sequence of operations illustrated in the flowchart of FIG. 2. The flowchart of FIG. 3 illustrates that portion of the principal sequence in which the A/D converter's output is read and acted upon by the CPU 60. It is in this particular subroutine that predetermined values from a look-up table may be substituted for actual parameter measurement values measured by the CPU 60 at the output of the A/D converter in the switching device of the present disclosure. Thus, in order to perform self-testing under actual conditions and during the time when the switching device system is fully in operation, it is necessary to substitute predetermined test parameter values for actual parameter values and continue on with the main sequence of operations. The routine provides for appropriate indications of the status of the particular test being run. Thus, in block 300, when the A/D converter output is read, it is seen that the flow proceeds to block 302 to determine whether a self-test is in progress, e.g., as in blocks 240 to 254 described hereinabove, and if the result is negative, then the flow proceeds along the path labeled "N" to block 304 where the A/D buffer receives the contents of the A/D reading which is the actual parameter measurement being measured at the particular time that the A/D converter is being read. Following the reading of the A/D converter output into the A/D buffer, the flow proceeds along the path to block 318 which enables the subroutine to be returned to the main program. Returning to decision block 302, if the determination was made that a self-test is in progress, then the flow proceeds along the path labeled "Y" to a function block 306 where values from the look-up table are stored in the A/D buffer instead of the actual values from the A/D converter so that they may be used during a subsequent self-test operation. Following storage of the predetermined values from the look-up table into the A/D buffer, the flow proceeds to block 308 to increment the loop-up table index and proceed thereupon with the self-test routine as will be described hereinbelow in conjunction with FIG. 4.

Upon the completion of the self-test, a decision block 310 determines whether the self-test conditions were okay or not okay and if the conditions indicated that the test results using the look-up table values are okay, then the flow proceeds along the Y path to block 312 indicating that the self-test has been passed and the flow returns to the main routine at block 318. Returning to block 310, if the self-test conditions are not okay, that is, there has been a failure of a condition of the self-test routine, then flow proceeds along the N path to block 314 where it is confirmed that a self-test has failed and thereupon proceeds to block 316 to turn on an LED indicator indicating that a test has failed and further system checks by the user are warranted. Following turning on the LED indicator, the flow proceeds to the return block 318 to return to the main routine. In some applications of the switching device described herein, a reset switch (not shown) is provided upon the switching device to reset the system and turn off the LED indicator when it is desired to return the switching device to full operation.

Another aspect of the sampling rate discussed hereinabove occurs when the self-test routine is in progress (see block 302 in FIG. 3 below). Whenever the sequence of operation, which is performed each sampling cycle, encounters the Read A/D (line current) step in block 214 of FIG. 2a, one sample of the waveform data is read from the look-up-table as shown in FIG. 3, step 306. Most waveforms are characterized by a sequence of data points, one for each sample. For complex arc waveforms the number of samples required may be one or two hundred. Thus reading all of the samples requires one or two hundred sampling cycles. During this reading of waveform samples, the usual Read A/D (line current) is bypassed while the self-test steps are being performed.

Referring now to FIG. 4 which is shown in two parts in FIG. 4a and FIG. 4b, there is illustrated a flowchart for the self-test portion of the principal sequence of operation illustrated in FIG. 2. This self-test routine is run every time it is called during the main sequence of operations illustrated in FIG. 2 and serves to periodically test the sensing, processing and trip operations of the switching device of the present disclosure under real conditions using simulated signals. The test values for use as limits in determining whether the sensed values are within or without limits are the predetermined values stored in the look-up table previously described in conjunction with FIG. 3. Beginning with the self-test block 400 which corresponds with the self-test blocks previously described in FIGS. 2 and 3 in several locations, the flow proceeds to block 402 which is a decision block to determine whether either of three conditions has occurred. If either of the three conditions has occurred, then the flow is returned to the main routine at return block 404 which is reached through the Y path shown in FIG. 4a. These three conditions include, first, whether or not the switching device or the breaker has tripped; second, whether or not an arc detection routine is in progress; or third, whether or not a ground fault detection is in progress. This decision block 402 is provided to exit the self-test routine if any of the aforementioned tasks are in process, thus giving priority to these operations over a routine self-test. If none of these operations are in process, then the flow proceeds from block 402 along the N path to decision block 406 where the system checks to be sure that the A/D converter's low current test produces a satisfactory result. This test consists of outputting a specified test pulse to the current sensing circuitry to determine whether or not the A/D converter responds appropriately to the particular current sense signal that has been placed at an input node 116 of the current sensing circuitry. For example, if it is desired to test the low current sensing ability of the sensing circuitry and the A/D converter, then the signal level at the TEST terminal of CPU 60 is set to a logic low for a particular interval during which the test will be made. If the A/D converter responds appropriately indicating a low current value, then the test has shown that both the current sensing circuitry and the A/D converter operation for that condition is satisfied. If, on the other hand, it is desired to test the high current capability of the current sensing circuitry and the A/D converter, then the test pulse will be set to a logic high for the specified interval to make the determination as to whether the response of the system to the test signal is appropriate. This test will be described further in the self-test routine to be described hereinbelow.

Returning to decision block 406, if the A/D low current test is okay, then the flow proceeds to block 408 to initialize the arc table look-up test. If, on the other hand, the A/D converter low current test was not okay, then the flow proceeds along the N path to a block 410 where the result of a failure of a low current reading is entered into memory for later use. Following the entry into memory of the low current reading failure, then the flow proceeds back to the input of block 408 to initialize the arc table look-up test. This test, for example, may be a routine to check whether the contents of the look-up table to be used during arc detection operations is unoccupied or contains data that is no longer of use. Following block 408, the flow proceeds to block 412 where the system turns on the test pulse; that is, it applied the test pulse as an active high or an active low to proceed with the particular current test. Following the turning on of the test pulse in block 412, the flow proceeds through a timer block for one millisecond time interval to set the duration of the test pulse from test pin of CPU 60. Once the one millisecond timer times out, the flow proceeds along the Y path to decision block 416 where the A/D converter performs the high current test, that is, with a test pulse of a logic high value for the one millisecond duration. If the result of that determination is affirmative, then the flow proceeds along the Y path to the encircled letter A which indicates the path is to be continued on FIG. 4b. Returning to block 416, if the A/D converter high current test is not okay, then the flow proceeds to block 418 where the indication of the high current reading failing is entered into memory for later use, thereupon followed by returning the flow to the self-test routine at the encircled letter A.

Continuing with FIG. 4b, the flow enters block 420 to read the ground fault sensing circuit output followed by a decision block 422 which makes a determination as to whether the ground fault output is within limits and, if the result is affirmative, the flow proceeds to block 426 to turn off the test pulse. If the ground fault circuit sensing output was not within limits, then the flow proceeds along the path labeled "N" from decision block 422 to function block 424 where the failed ground fault circuit reading is entered into memory for later use and the flow proceeds to the self-test routine to turn off the test pulse in block 426. The flow then proceeds to block 428 to turn on the output drive bit which is the trip output pulse provided at the TRIP output of CPU 60 and used to trigger the triac 30 when it is necessary to open the separable contacts 20 and 21. The drive bit, when turned on during the self-test routine in block 428, supplies the active high level of the trip output but extinguishes the output after a very short interval of time which is long enough for the CPU 60 to determine whether, in fact, the active high condition existed at the trip pin in response to the instruction during the self-test sequence in block 428 to turn on the trip output drive bit. The duration of the test for the trip output is short enough that the capacitor across the gate resistor 46 shown in FIG. 1 does not have enough time to fully charge up to the value needed to reliably turn on the triac 30, thus inhibiting the gate drive to the triac while permitting the TRIP output circuitry of CPU 60 to demonstrate that it has the ability to provide the trip level needed when the occasion demands. If, in decision block 430, the trip output is determined to be active high during the test interval, then the flow proceeds along the Y path to block 434 to turn off the TRIP output drive bit and proceed to a decision block 436. If, however, the TRIP output is not active high, indicating that a malfunction exists in the trip output drive circuit, then the flow proceeds along the N path to block 432 for the system to record that the trip driver has failed and to enter that information in memory for later use. In decision block 436, the determination is made whether any test during the self-test routine just completed failed and if a failure indication is retrieved from memory for any one of the tests, then the flow proceeds along the Y path to block 438 to turn on an LED indicator indicating that a test failure occurred which is followed by function block 440 to set the corresponding trip code in the memory of CPU 60 for retrieval by service personnel to determine which of the self-test steps did not meet the required conditions. Following setting the corresponding trip code in block 440, the flow returns to the main self-test path and enters block 442 to set the self-test flag equal to one indicating that the self-test routine for that sampling interval has been completed. This flag may remain active until reset during service to correct the malfunction identified during the self-test routine. If the determination made in block 436 was that there was no test that failed during this particular self-test sampling cycle, the flow follows the N path to block 442 to set the self-test flag equal to one indicating completion of the self-test. Following setting the test flag, flow proceeds to block 444 to return to the main sequence of operations illustrated in FIG. 2. It will be appreciated that, unless the self-test was manually initiated, the separable contacts 20, 21 will not be tripped in the event of a test failure. In order to maintain as much functionality as possible even in the event of a malfunction, the homeowner may be alerted by an LED indicator or other visible or audible indicator that a failure occurred during the self-test, while the switching device remains operational to protect against actual fault conditions. The data associated with the self-test failure may be stored in memory for later interrogation via the RS-232 communications port 56 by service personnel.

Although the preferred embodiment has been described in detail, it should be understood that various changes, substitutions and alterations can be made therein without departing from the spirit and scope of the invention as defined by the appended claims.

What is claimed is:

1. Apparatus for testing a circuit switching device, having separable contacts for controlling AC power supplied to a circuit responsive to at least one of a plurality of fault conditions, wherein the AC power provides an alternating line current having a line voltage and a frequency comprising:

a processor having an A/D converter with parameter inputs coupled thereto and operating according to a periodic sampling cycle to measure operating parameters of said circuit with a sensing circuit and detect said fault conditions occurring therein;

a first memory coupled to said processor for storing said operating parameters of said circuit output from said A/D converter when measured by said processor for use in determining said fault conditions;

a second memory coupled to said processor and having stored therein predetermined parameter values for substitution for said measured parameters when a self-test has been invoked during said sampling cycle;

a controller for running said self-test upon being invoked during said sampling cycle.

2. The apparatus of claim 1, comprising:

said controller automatically, upon reaching a predetermined number of counts or manually upon actuation of a test switch, running said self-test.

3. The apparatus of claim 2, wherein said controller causes an exit from said self-test if any one of a select group of operations is in process wherein said select group of operations includes one or more operations from the select group including the separable contacts have opened, an arc detection is in process or a ground fault detection is in process.

4. The apparatus of claim 2, wherein an operating parameter is read into said A/D converter for measurement upon a determination by said controller that a preliminary condition is satisfied.

5. The apparatus of claim 4, wherein said preliminary condition for measuring line current in said circuit comprises a determination whether said separable contacts are closed.

6. The apparatus of claim 4, wherein said preliminary condition for measuring line voltage of said circuit comprises a determination whether said line voltage is at or near a peak value.

7. The apparatus of claim 4, wherein said preliminary condition for measuring temperature in said switching device comprises a determination whether arc detection sensing and ground fault sensing have been completed.

8. The apparatus of claim 2, wherein said controller comprises:

indicating means for indicating a test failure when said self-test is invoked upon reaching said predetermined number of counts and a self-test procedure fails.

9. The apparatus of claim 2, wherein said controller comprises:

trip means for opening said separable contacts when said self-test is invoked upon actuation of said test switch and a self-test procedure fails; and indicating means for indicating actuation of said test switch.

10. The apparatus of claim 2, wherein said controller comprises:
   test means for performing one or more self-test procedures in a sequence;
   a log for keeping track whether any self-test object failed to meet a test condition; and
   a flag for setting to true at the end of said sequence.

11. The apparatus of claim 10, wherein said test means comprises:
   a first pulse generator for generating a test pulse;
   a first coupling means for conducting said test pulse to a line current sensing circuit; and
   a first comparator for determining whether a response of said output of said A/D converter to said test pulse exceeds a self-test limit.

12. The apparatus of claim 10, wherein said test means comprises:
   a first pulse generator for generating a test pulse;
   a second coupling means for conducting said test pulse to a ground fault sensing circuit; and
   a comparator for determining whether a response of said output of said A/D converter to said test pulse exceeds a self-test limit.

13. The apparatus of claim 10, wherein said test means comprises:
   a second pulse generator for generating a test trip pulse;
   a third coupling means for transmitting said test trip pulse to a trip terminal of said switching device; and
   a second comparator for determining whether said test trip pulse was present at said trip terminal.

14. The apparatus of claim 1, comprising:
   a sensing circuit, having an output coupled to a corresponding input of said A/D converter of said processor for sensing a one of said circuit parameters in said circuit controlled by said switching device, for obtaining a value of one of said circuit parameters to be measured.

15. The apparatus of claim 1, said processor comprising:
   a first output for providing a failure indication when a self-test condition is not met.

16. The apparatus of claim 1, wherein said processor generates said periodic sampling cycle at a rate substantially synchronized with and substantially higher than the frequency of the AC power.

17. The apparatus of claim 1, wherein said operating parameters include one or more of at least voltage, current or temperature, each sensed at one or more locations in said circuit.

18. The apparatus of claim 16, wherein said rate of said periodic sampling cycle is at least equal to the Nyquist rate for ten times said line frequency of said AC power.

19. The apparatus of claim 17, wherein said operating parameters are read at predetermined times during said sampling cycle.

20. The apparatus of claim 1, wherein said first memory comprises a buffer memory for said output from said A/D converter.

21. The apparatus of claim 1, wherein said second memory comprises a look up table.

22. A method for testing a circuit switching device having separable, contacts and is operable under processor control to control AC power to a circuit in response to at least one of a plurality of fault conditions, wherein the AC power provides an alternating line current having a line voltage and a frequency comprising the steps of:
   controlling the switching device during a sampling cycle, to input one or more operating parameters sensed in the circuit to an A/D converter for measurement wherein the operating parameters enable detection of the fault conditions;
   determining whether to read a select one of the operating parameters from an output of the A/D converter into a first memory; and
   reading predetermined parameter values from a second memory into the first memory during the sampling cycle instead of the operating parameters read from the A/D converter if a self-test has been invoked during the sampling cycle.

23. The method of claim 22, wherein the method for testing a circuit switching device further comprises the step of:
   issuing a failure indication when a self-test condition is not met.

24. The method of claim 22, wherein the step of controlling the switching device comprises the steps of:
   repeating the sampling cycle at a periodic rate substantially synchronized with a line frequency of the AC power under control of the processor in the switching device; and
   including among the operating parameters one or more of at least voltage, current or temperature, each sensed at one or more locations in the circuit.

25. The method of claim 24, wherein the step of repeating comprises the step of:
   setting the periodic rate substantially higher than the frequency of the AC power supplied to the circuit.

26. The method of claim 24, wherein the step of repeating comprises the step of:
   setting the periodic rate at least equal to the Nyquist rate for ten times the frequency of the AC power.

27. The method of claim 24, wherein the step of including among the operating parameters comprises the step of:
   reading the operating parameters at predetermined times during the sampling cycle.

28. The method of claim 22, wherein the step of determining comprises the step of:
   conditioning the reading of one or more of the operating parameters sensed in the circuit upon a preliminary result during the operation of the sampling cycle.

29. The method of claim 28, wherein the step of conditioning comprises the step of:
   checking whether the separable contacts are closed preliminary to measuring a line current in the circuit.

30. The method of claim 28, wherein the step of conditioning comprises the step of:
   checking whether the line voltage of the AC power is near a peak value preliminary to measuring the line voltage.

31. The method of claim 28, wherein the step of conditioning comprises the step of:
   checking whether arc sensing and ground fault sensing have been completed preliminary to measuring the temperature of the switching device.

32. The method of claim 22, wherein the step of reading comprises the steps of:
   invoking a self-test automatically upon reaching a predetermined number of counts or manually upon actuation of a test switch; and
   running the self-test.

33. The method of claim 32, wherein the step of running the self-test comprises the step of:

exiting the self-test if any one of a select group of operations is in process wherein the select group of operations includes one or more operations from the group including the separable contacts have opened, an arc detection is in process or a ground fault detection is in process.

34. The method of claim 32, wherein the step of invoking comprises the step of:

providing an indication of a test failure when the self-test is invoked upon reading the predetermined number of counts and a self-test procedure fails.

35. The method of claim 32, wherein the step of invoking comprises the steps of:

opening the separable contacts when the self-test is invoked upon actuation of the test switch and a self-test procedure fails; and indicating operation of the test switch in human perceptible form.

36. The method of claim 32, wherein the step of invoking a self-test comprises the steps of:

performing one or more tests in sequence;

logging whether any self-test object failed to meet a test condition; and setting a self-test flag true at the end of a test sequence.

37. The method of claim 36, wherein the step of performing comprises the steps of:

transmitting a test pulse to a current sensing circuit; and testing an output of the A/D converter in response thereto.

38. The method of claim 36, wherein the step of performing comprises the steps of:

transmitting a test pulse to a ground fault sensing circuit; and testing an output of the A/D converter in response thereto.

39. The method of claim 36, wherein the step of performing comprises the steps of:

transmitting a test trip pulse to a trip circuit in the circuit switching device; and testing an output of the trip circuit in response thereto.

* * * * *